United States Patent
Ammanamanchi et al.

(10) Patent No.: US 12,395,059 B2
(45) Date of Patent: Aug. 19, 2025

(54) SYSTEMS AND METHODS FOR INTEGRATED BOOST IN HIGH VOLTAGE AND LOW VOLTAGE POWER CONVERSION FOR BATTERY CHARGER

(71) Applicant: BorgWarner Luxembourg Automotive Systems S.A., Bascharage (LU)

(72) Inventors: Venkata Jaya Sai Praneeth Ammanamanchi, Lamadelaine (LU); Joseph Engel, Oberkorn (LU); Julien Schmitt, Kuntzig (FR)

(73) Assignee: BorgWarner Luxembourg Automotive Systems S.A.

( * ) Notice: Subject to any disclaimer, the term of this patent is extended or adjusted under 35 U.S.C. 154(b) by 459 days.

(21) Appl. No.: 18/047,067

(22) Filed: Oct. 17, 2022

(65) Prior Publication Data

US 2024/0128849 A1  Apr. 18, 2024

(51) Int. Cl.
  *H02M 1/00* (2007.01)
  *B60L 53/22* (2019.01)
  *H02J 7/00* (2006.01)
  *H02M 1/42* (2007.01)
  *H02M 3/335* (2006.01)

(52) U.S. Cl.
  CPC ............ *H02M 1/007* (2021.05); *B60L 53/22* (2019.02); *H02J 7/0063* (2013.01); *H02M 1/4225* (2013.01); *H02M 3/33584* (2013.01); *B60L 2210/12* (2013.01); *B60L 2210/14* (2013.01)

(58) Field of Classification Search
  CPC ............... H02M 1/007; H02M 1/4225; H02M 3/33584; H02M 1/0077
  See application file for complete search history.

(56) References Cited

U.S. PATENT DOCUMENTS

| | | | |
|---|---|---|---|
| 8,994,327 B2 | 3/2015 | Kusch | |
| 9,973,028 B2 | 5/2018 | Namuduri | |
| 11,005,380 B2 | 5/2021 | Kanda et al. | |
| 11,223,292 B2 | 1/2022 | Yang et al. | |
| 11,831,236 B2 * | 11/2023 | Dai | H02M 7/797 |
| 2013/0278214 A1 | 10/2013 | Satoh | |
| 2018/0222333 A1 * | 8/2018 | Khaligh | H02M 1/4258 |
| 2021/0061114 A1 * | 3/2021 | Sun | H02J 7/02 |

FOREIGN PATENT DOCUMENTS

WO  2021247278 A1  12/2021

* cited by examiner

*Primary Examiner* — Adolf D Berhane
*Assistant Examiner* — Afework S Demisse
(74) *Attorney, Agent, or Firm* — Joshua M. Haines; Bookoff McAndrews, PLLC

(57) ABSTRACT

A system comprises: a high voltage (HV) direct current (DC) to DC converter (HVDC) including: one or more transformers; a bridge driver connected to a primary side of the one or more transformers; and one or more bridge rectifiers connected to a secondary side of the one or more transformers, the one or more bridge rectifiers including one or more bridge rectifier switches; a low voltage (LV) DC to DC converter (LVDC) connected to the HVDC; and a boost converter including: an inductor connected to the one or more bridge rectifier switches; and one or more boost configuration switches operable, in combination with the one or more bridge rectifier switches, to configure the boost converter into each of a bypass configuration and a boost configuration, to regulate a voltage at the LVDC.

20 Claims, 12 Drawing Sheets

1200

---

CONTROLLING AN OPERATION OF THE ONE OR MORE BOOST CONFIGURATION SWITCHES, IN COMBINATION WITH THE ONE OR MORE BRIDGE RECTIFIER SWITCHES, TO CONFIGURE THE BOOST CONVERTER INTO EACH OF A BYPASS CONFIGURATION AND A BOOST CONFIGURATION, TO REGULATE A VOLTAGE AT THE LVDC

1210

---

CONTROLLING AN OPERATION OF ONE OR MORE SECONDARY CONFIGURATION SWITCHES OPERABLE TO CONFIGURE A FIRST BRIDGE RECTIFIER AND A SECOND BRIDGE RECTIFIER OF THE ONE OR MORE BRIDGE RECTIFIERS INTO EACH OF A SINGLE RECTIFIER CONFIGURATION, A PARALLEL RECTIFIER CONFIGURATION, AND A SERIES RECTIFIER CONFIGURATION

1220

---

CONTROLLING AN OPERATION OF THE ONE OR MORE BOOST CONFIGURATION SWITCHES, IN COMBINATION WITH THE ONE OR MORE BRIDGE RECTIFIER SWITCHES AND THE ONE OR MORE SECONDARY CONFIGURATION SWITCHES, TO CONFIGURE THE BOOST CONVERTER INTO EACH OF A CASCADE CONFIGURATION, A PRE-CHARGING CONFIGURATION, A BUCK-STAGE PRE-CHARGING CONFIGURATION, AND A VEHICLE-TO-LOAD CONFIGURATION, TO REGULATE A VOLTAGE AT THE LVDC

1230

---

CONTROLLING THE OPERATION OF A FIRST BOOST CONFIGURATION SWITCH AND A SECOND BOOST CONFIGURATION SWITCH OF THE ONE OR MORE BOOST CONFIGURATION SWITCHES, IN COMBINATION WITH THE ONE OR MORE BRIDGE RECTIFIER SWITCHES AND THE ONE OR MORE SECONDARY CONFIGURATION SWITCHES, TO CONFIGURE THE BOOST CONVERTER INTO EACH OF THE BYPASS CONFIGURATION, THE BOOST CONFIGURATION, THE CASCADE CONFIGURATION, THE PRE-CHARGING CONFIGURATION, THE BUCK-STAGE PRE-CHARGING CONFIGURATION, AND THE VEHICLE-TO-LOAD CONFIGURATION, BY CONTROLLING THE FIRST BOOST CONFIGURATION SWITCH TO CONNECT OR DISCONNECT ONE END OF THE INDUCTOR TO A HV BATTERY, AND CONTROLLING THE SECOND BOOST CONFIGURATION SWITCH TO CONNECT THE LVDC TO EITHER THE HV BATTERY OR THE SECOND BRIDGE RECTIFIER

1240

---

RECEIVING INPUT AC POWER, CONVERTING THE AC POWER TO DC POWER, AND PROVIDING THE DC POWER TO ONE OR MORE OF THE HV BATTERY AND THE LV BATTERY BASED ON THE OPERATION OF THE ONE OR MORE BOOST CONFIGURATION SWITCHES TO CHARGE ONE OR MORE OF THE HV BATTERY AND THE LV BATTERY, AND RECEIVING DC POWER FROM ONE OR MORE OF THE HV BATTERY AND THE LV BATTERY, CONVERTING THE DC POWER TO AC POWER, AND PROVIDING THE AC POWER AS OUTPUT AC POWER

1250

---

OPERATING ONE OR MORE SWITCHES OF THE BRIDGE RECTIFIER OF THE HVDC TO REGULATE A VOLTAGE AT THE LVDC

SYSTEMS AND METHODS FOR INTEGRATED BOOST IN HIGH VOLTAGE AND LOW VOLTAGE POWER CONVERSION FOR BATTERY CHARGER

TECHNICAL FIELD

Various embodiments of the present disclosure relate generally to an integrated boost converter in high voltage and low voltage power conversion for a battery charger for an electric vehicle.

BACKGROUND

In the field of battery chargers, a two-stage layout is generally used to meet a requirement for use in automotive vehicles as an onboard charger. These onboard chargers have high power density, with less weight and require less space. The configuration layout used in single-phase or three-phase chargers includes an alternating current (AC) to direct current (DC) Power Factor Correction (PFC) converter at stage I and an isolated DC-DC converter at stage II. Additionally, a low voltage (LV) DC-DC converter is required to convert the high voltage to LV, such as 12V, for example. In this conversion, a boost converter is generally used to fulfill different modes such as pre-charging of capacitors and providing sufficient high voltage (HV) to DC-DC converters in case of lower battery voltages. A boost converter is typically added at the input of the DC-DC converter. However, the boost converter adds to the component count of onboard chargers.

The present disclosure is directed to overcoming one or more of these above-referenced challenges.

SUMMARY OF THE DISCLOSURE

In some aspects, the techniques described herein relate to a system including: a high voltage (HV) direct current (DC) to DC converter (HVDC) including: one or more transformers; a bridge driver connected to a primary side of the one or more transformers; and one or more bridge rectifiers connected to a secondary side of the one or more transformers, the one or more bridge rectifiers including one or more bridge rectifier switches; a low voltage (LV) DC to DC converter (LVDC) connected to the HVDC; and a boost converter including: an inductor connected to the one or more bridge rectifier switches; and one or more boost configuration switches operable, in combination with the one or more bridge rectifier switches, to configure the boost converter into each of a bypass configuration and a boost configuration, to regulate a voltage at the LVDC.

In some aspects, the techniques described herein relate to a system, further including: one or more controllers configured to control an operation of the one or more boost configuration switches and the one or more bridge rectifier switches.

In some aspects, the techniques described herein relate to a system, wherein the one or more boost configuration switches includes a single boost configuration switch.

In some aspects, the techniques described herein relate to a system, wherein the one or more controllers are configured to control the operation of the single boost configuration switch to configure the boost converter into the bypass configuration by controlling the single boost configuration switch to disconnect one end of the inductor from an HV battery and connect one leg of the HVDC to the HV battery.

In some aspects, the techniques described herein relate to a system, wherein the one or more controllers are configured to control the operation of the single boost configuration switch to configure the boost converter into the boost configuration by controlling the single boost configuration switch to connect one end of the inductor to an HV battery and disconnect one leg of the HVDC from the HV battery.

In some aspects, the techniques described herein relate to a system, wherein the one or more bridge rectifiers include a first bridge rectifier and a second bridge rectifier, and the one or more boost configuration switches include a first boost configuration switch and a second boost configuration switch.

In some aspects, the techniques described herein relate to a system, wherein the one or more transformers includes a multiple winding transformer with a first secondary winding and a second secondary winding, and the first bridge rectifier is connected to the first secondary winding and the second bridge rectifier is connected to the second secondary winding.

In some aspects, the techniques described herein relate to a system, further including: one or more secondary configuration switches operable to configure the first bridge rectifier and the second bridge rectifier into each of a single rectifier configuration, a parallel rectifier configuration, and a series rectifier configuration.

In some aspects, the techniques described herein relate to a system, wherein the one or more boost configuration switches are further operable, in combination with the one or more bridge rectifier switches and the one or more secondary configuration switches, to configure the boost converter into each of a cascade configuration, a pre-charging configuration, a buck-stage pre-charging configuration, and a vehicle-to-load configuration, to regulate a voltage at the LVDC.

In some aspects, the techniques described herein relate to a system, wherein the one or more controllers are configured to control the operation of the first boost configuration switch and the second boost configuration switch, in combination with the one or more bridge rectifier switches and the one or more secondary configuration switches, to configure the boost converter into each of the bypass configuration, the boost configuration, the cascade configuration, the pre-charging configuration, the buck-stage pre-charging configuration, and the vehicle-to-load configuration, by controlling the first boost configuration switch to connect or disconnect one end of the inductor to an HV battery, and controlling the second boost configuration switch to connect the LVDC to either the HV battery or the second bridge rectifier.

In some aspects, the techniques described herein relate to a system, wherein the one or more bridge rectifier switches include one or more bridge rectifier switches of the first bridge rectifier and one or more bridge rectifier switches of the second bridge rectifier.

In some aspects, the techniques described herein relate to a system, further including: an alternating current (AC) to DC Power Factor Correction (PFC) converter connected to the bridge driver to provide the system as a battery charger, an HV battery connected to the HVDC, and an LV battery connected to the LVDC, wherein the battery charger is configured to: receive input AC power through the PFC converter, convert the AC power to DC power, and provide the DC power to one or more of the HV battery and the LV battery based on the operation of the one or more boost configuration switches to charge one or more of the HV battery and the LV battery, and receive DC power from one or more of the HV battery through the HVDC or the LV battery through the LVDC based on the operation of the one or more boost configuration switches, convert the DC power to AC power, and provide the AC power through the PFC converter as output AC power.

In some aspects, the techniques described herein relate to a system, wherein the one or more controllers are further configured to control the operation of the one or more boost configuration switches based on one or more of a voltage of one or more of the HV battery, the LV battery, or the AC power received through the PFC converter.

In some aspects, the techniques described herein relate to a system, further including: an electric vehicle including the battery charger, the HV battery, and the LV battery.

In some aspects, the techniques described herein relate to a method for controlling a system including a high voltage (HV) direct current (DC) to DC converter (HVDC) including one or more transformers, a bridge driver connected to a primary side of the one or more transformers, and one or more bridge rectifiers connected to a secondary side of the one or more transformers, the one or more bridge rectifiers including one or more bridge rectifier switches; a low voltage (LV) DC to DC converter (LVDC) connected to the HVDC; and a boost converter including an inductor connected to the one or more bridge rectifier switches, and one or more boost configuration switches, the method including performing, by one or more controllers, operations including: controlling an operation of the one or more boost configuration switches, in combination with the one or more bridge rectifier switches, to configure the boost converter into each of a bypass configuration and a boost configuration, to regulate a voltage at the LVDC.

In some aspects, the techniques described herein relate to a method, wherein the operations further include controlling an operation of one or more secondary configuration switches operable to configure a first bridge rectifier and a second bridge rectifier of the one or more bridge rectifiers into each of a single rectifier configuration, a parallel rectifier configuration, and a series rectifier configuration.

In some aspects, the techniques described herein relate to a method, wherein the operations further include controlling an operation of the one or more boost configuration switches, in combination with the one or more bridge rectifier switches and the one or more secondary configuration switches, to configure the boost converter into each of a cascade configuration, a pre-charging configuration, a buck-stage pre-charging configuration, and a vehicle-to-load configuration, to regulate a voltage at the LVDC.

In some aspects, the techniques described herein relate to a method, wherein the operations further include controlling the operation of a first boost configuration switch and a second boost configuration switch of the one or more boost configuration switches, in combination with the one or more bridge rectifier switches and the one or more secondary configuration switches, to configure the boost converter into each of the bypass configuration, the boost configuration, the cascade configuration, the pre-charging configuration, the buck-stage pre-charging configuration, and the vehicle-to-load configuration, by controlling the first boost configuration switch to connect or disconnect one end of the inductor to an HV battery, and controlling the second boost configuration switch to connect the LVDC to either the HV battery or the second bridge rectifier.

In some aspects, the techniques described herein relate to a method, wherein the controlling the operation further includes: receiving input AC power, converting the AC power to DC power, and providing the DC power to one or more of an HV battery and an LV battery based on the operation of the one or more boost configuration switches to charge one or more of the HV battery and the LV battery, and receiving DC power from one or more of the HV battery and the LV battery based on the operation of the one or more boost configuration switches, converting the DC power to AC power, and providing the AC power as output AC power.

In some aspects, the techniques described herein relate to a method for controlling a system including a high voltage (HV) direct current (DC) to DC converter (HVDC) including one or more transformers, a bridge rectifier connected to a secondary side of the one or more transformers, and a low voltage (LV) DC to DC converter (LVDC) connected to the HVDC, the method including: operating one or more switches of the bridge rectifier of the HVDC to regulate a voltage at the LVDC.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 12 depicts a flowchart of a method of operating a battery charger with an integrated boost converter, according to one or more embodiments.

DETAILED DESCRIPTION OF EMBODIMENTS

Figure 1:
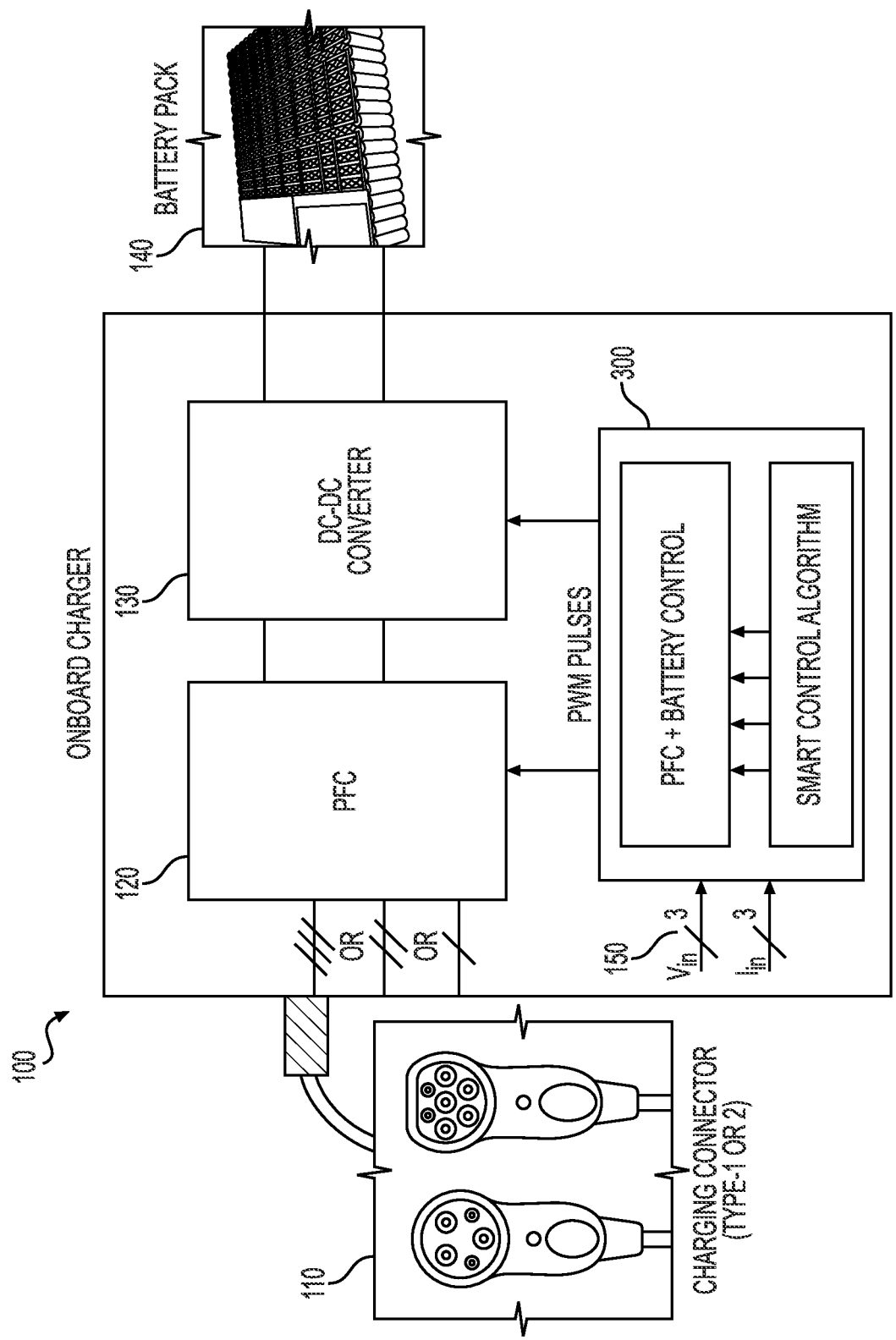
FIG. 1 depicts an exemplary system infrastructure for a battery charger, according to one or more embodiments.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

Various embodiments of the present disclosure relate generally to systems and methods for an integrated boost converter in high voltage and low voltage power conversion for a battery charger for an electric vehicle.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

In the field of battery chargers, a two-stage layout is generally used to meet a requirement for use in automotive vehicles as an onboard charger. These onboard chargers have high power density, with less weight and require less space. The configuration layout used in single-phase or three-phase chargers includes an alternating current (AC) to direct current (DC) Power Factor Correction (PFC) converter at stage I and an isolated DC-DC converter at stage II. Additionally, a low voltage (LV) DC-DC converter is required to convert the high voltage to LV, such as 12V, for example. In this conversion, a boost converter is generally used to fulfill different modes such as pre-charging of capacitors and providing sufficient high voltage (HV) to DC-DC converters in case of lower battery voltages. In general terms, the boost converter is used to provide a suitable voltage to the LV DC-DC converter, which may have a limited voltage operating range. A boost converter is typically added at the input of the LV DC-DC converter, using two switching devices combined with a boost inductor. The two switching devices of the convectional boost converter are in addition to switching devices of a bridge rectifier connected to a secondary side of a transformer of the isolated DC-DC converter at stage II. However, the boost converter adds to the component count of onboard chargers.

According to one or more embodiments, a boost converter may re-use components in the isolated DC-DC converter at stage II to operate without the additional switching devices of conventional boost converters. More specifically, rather than adding an additional two switching devices for the boost converter, two transistors of an existing half-bridge used for an on-board charger function are re-used to realize the boost function at the input of the LV DC-DC converter. This integrated boost converter may be used for pre-charging capacitors on the HV side using the LV battery, may be used for charging the LV battery using a DC-DC converter when high voltage (HV) is at a lower level, and may provide enhanced operation during de-rating conditions. The term "boost converter" in the disclosure may refer to a boost converter, a buck converter, or a boost/buck converter.

According to one or more embodiments, a charger may operate with a single-phase or three-phase AC power source. The charger may be designed to support a wide range of HV battery voltage ranges, for example, 400 volt and 800 volt systems and maximum output power of 11 kilowatts and 22 kilowatts. A DC-DC Converter with an LLC resonant structure may be used. A PFC converter with a single-phase or three-phase power supply may be employed.

A battery charger according to the disclosure may operate with multiple types of AC input power supplies, including single phase, split/dual/two phase, and three-phase power supplies. The charger may be compatible with a wide range of configuration. The algorithms may ensure the operation of the converter with wide variations in input voltages to generate a wide range of output voltages. An Inductor-Inductor-Capacitor (LLC) converter may be used as a second stage converter using a DC link voltage generated from the PFC as the input voltage for the converter. However, the disclosure is not limited thereto.

The input and output layout of the charger may follow automotive standards. A battery charger according to the disclosure may include a two-stage configuration, including an AC-DC power factor correction converter stage and an isolated DC-DC converter stage. The isolated DC-DC converter may include a full-bridge driver configuration with resonant tank elements to achieve better efficiency. The DC-DC converter may be designed to charge the battery from minimum voltage to maximum voltage.

A battery charger according to the disclosure may operate as a battery charger only, or operate bidirectionally for a charging operation or a power supply operation. The converter may either receive power from an AC power source and provide DC power to a battery, or receive power from the battery and provide power as an AC power source. A vehicle to grid (V2G) configuration may be achieved with a designed control strategy for single-phase, two-phase, and three-phase systems. Switches of the battery charger may be any devices, such as GTO, thyristors, or MOSFETs/IGBTs with series diodes, for example. These switches may also be mechanical components (such as relays or contactors) if sufficient failure rates and arcing conditions during operation are met. Additionally, if the switches are semi-permanent in position, the switches may be implemented as one or more jumper connectors or dual in-line package (DIP) switches.

FIG. 1 depicts an exemplary system infrastructure for a battery charger, according to one or more embodiments.

As shown in FIG. 1, a battery charger 100 may include or be electrically connectable to a charging connector 110. The charging connector 110 may provide an electrical connection from an external power supply to the battery charger 100, and may be a Type 1 or a Type 2 connector, for example. The charging connector 110 may transfer single phase, two-phase, or three phase power.

The battery charger 100 may include a Power Factor Correction (PFC) converter 120, an HV DC-DC converter (HVDC) 130, and a controller 300 receiving signals from input sensor 150. Controller 300 may include one or more controllers. The battery charger 100 may include or be electrically connectable to an HV battery 140. The battery charger 100 may be used in automotive vehicles as an onboard charger to transfer power from an external power source through charging connector 110 to HV battery 140, or to transfer power from HV battery 140 in a vehicle to grid configuration. The battery charger 100 may be included in a system provided as an electric vehicle including a motor configured to rotate based on power received from the HV battery 140.

Figure 2:
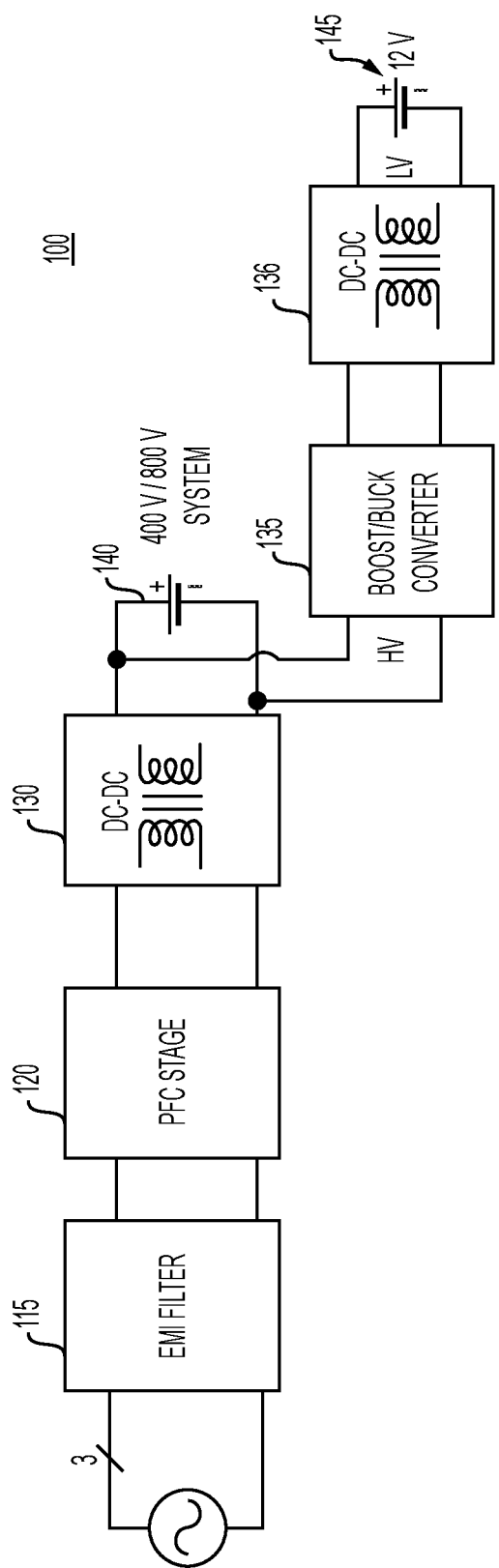
FIG. 2 depicts an exemplary electrical schematic for a battery charger with a boost converter, according to one or more embodiments.

FIG. 2 depicts an exemplary electrical schematic for a battery charger with a boost converter, according to one or more embodiments.

As shown in FIG. 2, the PFC converter 120 according to the disclosure may operate with a three-phase input. However, PFC converter 120 may also operate with a two-phase or single-phase input. Battery charger 100 may include electromagnetic interference (EMI) filter 115 between the voltage source and PFC converter 120. PFC converter 120 may be connected to HV DC-DC converter 130. HV DC-DC converter 130 may be operable to isolate the PFC converter 120 from HV battery 140. For example, HV DC-DC converter 130 may be a CLLLC converter, or any suitable DC-DC converter.

The battery charger 100 may include a controller 300 (see FIG. 3) configured to control an operation of battery charger 100. HV battery 140 may be connected to an output of the HV DC-DC converter 130. Additionally, a filter 160 (see FIG. 4) may be provided between the HV DC-DC converter 130 and HV battery 140.

The battery charger 100 may include a boost converter 135 connected to HV DC-DC converter 130, an LV DC-DC converter 136 connected to boost converter 135, and an LV battery 145 connected to LV DC-DC converter 136.

The battery charger 100 may operate bidirectionally. A vehicle to grid (V2G) or vehicle to load (V2L) configuration may be achieved with a designed control strategy for multiple voltages. The PFC converter 120 may be configured to receive DC power from one or more of the HV battery 140 through the HV DC-DC converter 130 or the LV battery 145 through the LV DC-DC converter 136, convert the DC power to AC power, and provide the AC power as an output.

Figure 3:
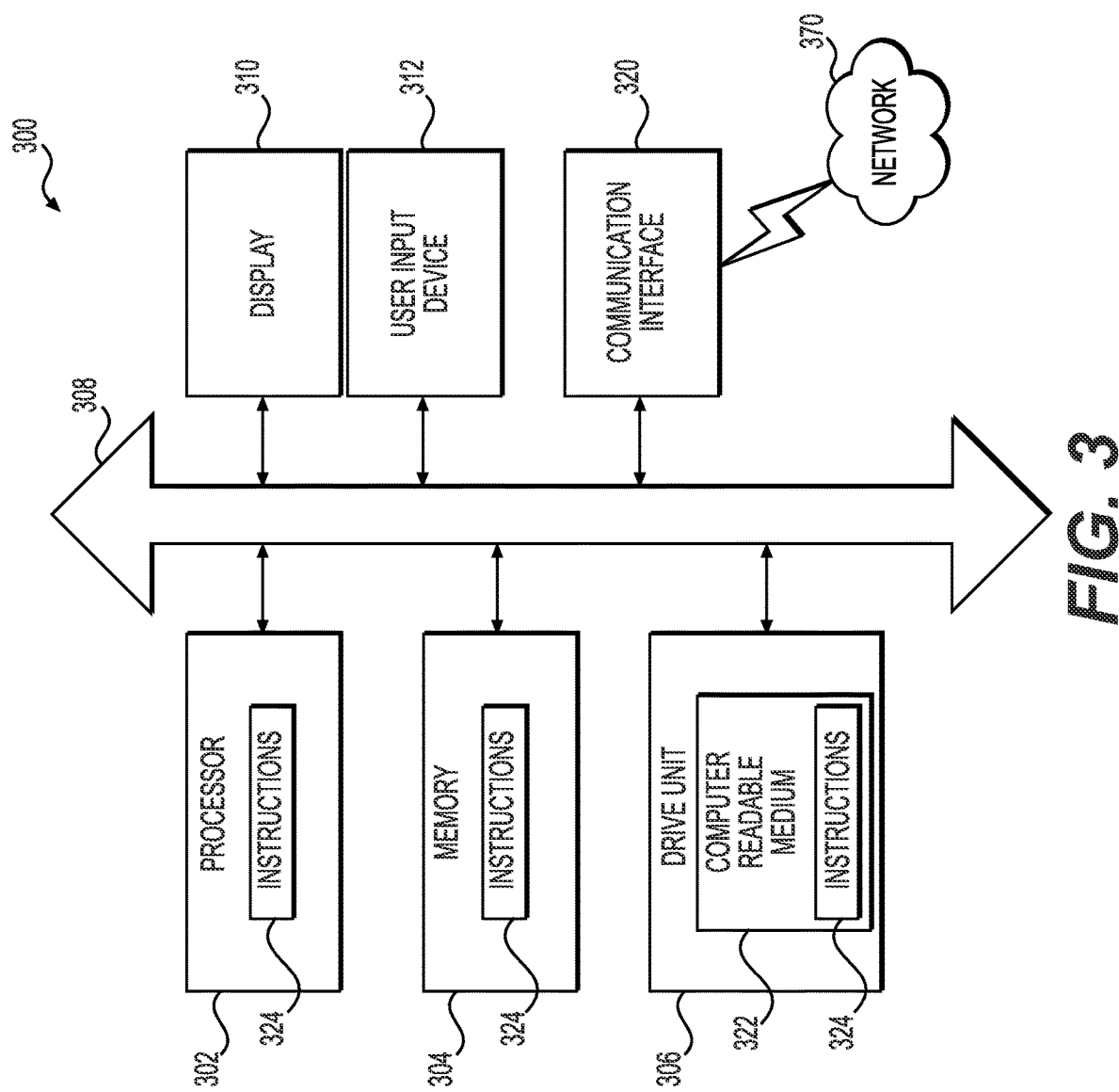
FIG. 3 depicts an implementation of a computer system that may execute techniques presented herein, according to one or more embodiments.

FIG. 3 depicts an implementation of a controller 300 that may execute techniques presented herein, according to one or more embodiments.

Any suitable system infrastructure may be put into place to allow control of the battery charger. FIG. 3 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 3. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

The controller 300 may include a set of instructions that can be executed to cause the controller 300 to perform any one or more of the methods or computer-based functions disclosed herein. The controller 300 may operate as a standalone device or may be connected, e.g., using a network, to other computer systems or peripheral devices.

In a networked deployment, the controller 300 may operate in the capacity of a server or as a client in a server-client user network environment, or as a peer computer system in a peer-to-peer (or distributed) network environment. The controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 300 can be implemented using electronic devices that provide voice, video, or data communication. Further, while the controller 300 is illustrated as a single system, the term "system" shall also be taken to include any collection of systems or sub-systems that individually or jointly execute a set, or multiple sets, of instructions to perform one or more computer functions.

As illustrated in FIG. 3, the controller 300 may include a processor 302, e.g., a central processing unit (CPU), a graphics processing unit (GPU), or both. The processor 302 may be a component in a variety of systems. For example, the processor 302 may be part of a standard computer. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the controller 300 may include an input device 312 configured to allow a user to interact with any of the components of controller 300. The input device 312 may be a number pad, a keyboard, or a cursor control device, such as a mouse, or a joystick, touch screen display, remote control, or any other device operative to interact with the controller 300.

The controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in controller 300, or combinations thereof. The connection with the network 370 may be a physical connection, such as a wired Ethernet connection or may be established wirelessly as discussed below. Likewise, the additional connections with other components of the controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
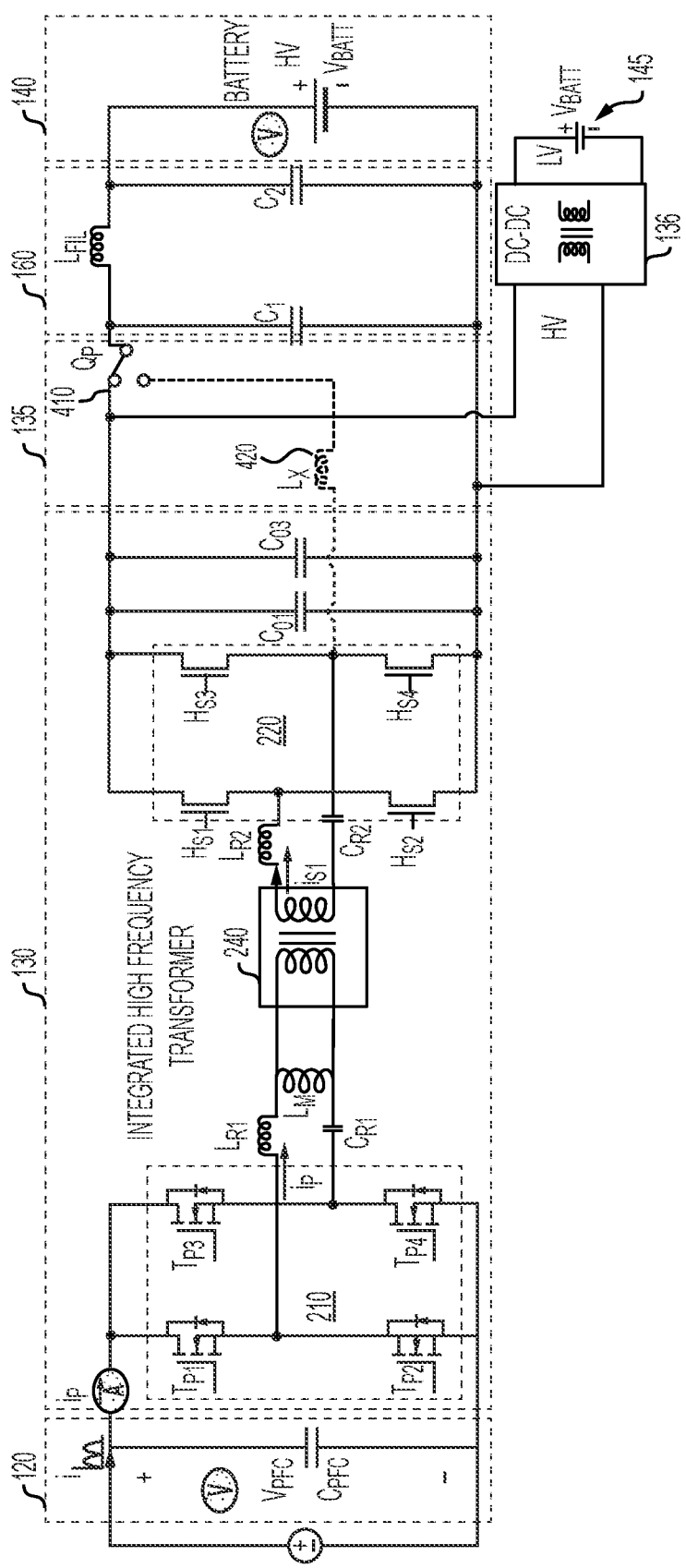
FIG. 4 depicts an exemplary electrical schematic for a battery charger with a single transformer and an integrated boost converter in a bypass configuration, according to one or more embodiments.

FIG. 4 depicts an exemplary electrical schematic for a battery charger with a single transformer and an integrated boost converter in a bypass configuration, according to one or more embodiments.

As shown in FIG. 4, capacitor Cpfc may be provided as a DC link capacitor at an output of PFC converter 120 with a voltage Vpfc to an input of HV DC-DC converter 130. HV DC-DC converter 130 may be operable to isolate the PFC converter 120 from HV battery 140. For example, HV DC-DC converter 130 may be a CLLLC converter, or any suitable DC-DC converter.

The battery charger 100 may be a system including PFC converter 120. HV DC-DC converter 130 may be connected to PFC converter 120. A voltage source may be connected to PFC converter 120, and HV battery 140 may be connected to HV DC-DC converter 130. Additionally, filter 160 may be provided between HV DC-DC converter 130 and HV battery 140.

The battery charger 100 may operate bidirectionally. A vehicle to grid (V2G) configuration may be achieved with a designed control strategy for multiple voltages. The PFC converter 120 may be configured to receive DC power from one or more of the HV battery 140 through the HV DC-DC converter 130 or the LV battery 145 through the LV DC-DC converter 136, convert the DC power to AC power, and provide the AC power as an output. The controller 300 may be designed with an algorithm to control an operation of the PFC converter 120 and HV DC-DC converter 130 to provide the AC power.

HV DC-DC converter 130 may include bridge driver 210, first bridge rectifier 220, and transformer 240.

Bridge driver 210 may include switches Tp1-Tp4, and may be operated as a full bridge driver or a half bridge driver, and transmit power as a square-wave signal from PFC converter 120 to transformer 240. Transformer 240 may be one or more high-frequency transformers and may be a single transformer with multiple coils or windings, multiple transformers with single coils or windings, or any combination thereof.

Transformer 240 may be connected to first bridge rectifier 220. First bridge rectifier 220 may include switches Hs1-Hs4. The switches of the first bridge rectifier 220 may convert the square-wave signal to DC power.

The battery charger 100 may include boost converter 135 connected to HV DC-DC converter 130, LV DC-DC converter 136 connected to boost converter 135, and LV battery 145 connected to LV DC-DC converter 136. Boost converter 135 may include boost configuration switch 410 (Qp) and inductor 420. Boost converter 135 may also re-use switches from first bridge rectifier 220.

Figure 5:
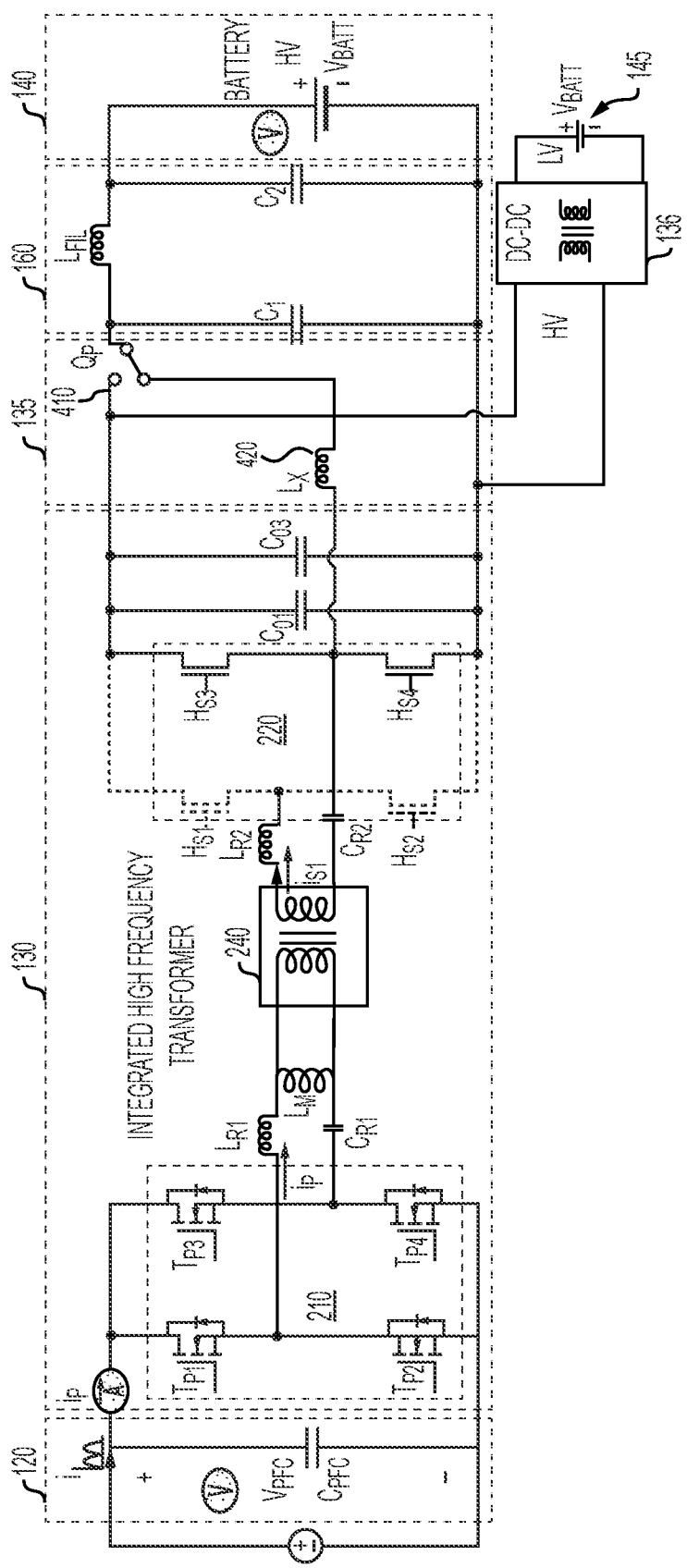
FIG. 5 depicts an exemplary electrical schematic for a battery charger with a single transformer and an integrated boost converter in a boost configuration, according to one or more embodiments.

Boost configuration switch 410 may be open and closed as applicable to configure boost converter 135 into each of a bypass configuration (see FIG. 4) and a boost configuration (see FIG. 5). Opening and closing of boost configuration switch 410 may be controlled by controller 300. The controller 300 may control the operation of boost configuration switch 410 based on one or more of a voltage of HV battery 140, a voltage of LV battery 145, an input grid voltage, a DC link voltage, a power requirement, and a state of charge of HV battery 140. However, the disclosure is not limited thereto, and controller 300 may control the operation of boost configuration switch 410 based on any appropriate signal.

As shown in FIG. 4, boost converter 135 may be configured in a bypass configuration when boost configuration switch 410 is in a position to disconnect inductor 420. Boost converter 135 may be configured in a bypass configuration when a voltage from the voltage source is above a threshold voltage so that a sufficient voltage is applied to LV DC-DC converter 136 to charge LV battery 145.

The controller 300 may be designed with and/or configured to execute an algorithm for control of the boost configuration switch 410, switches of the bridge driver 210, and switches of the first bridge rectifier 220. Controller 300 may be configured to control the operation of the single boost configuration switch 410 to configure the boost converter 135 into the bypass configuration by controlling the single boost configuration switch 410 to disconnect one end of the inductor 420 from HV battery 140 and connect one leg of the HVDC 130 to the HV battery 140.

FIG. 5 depicts an exemplary electrical schematic for a battery charger with a single transformer and an integrated boost converter in a boost configuration, according to one or more embodiments. The structure of battery charger 100 is described above with reference to FIG. 4.

As shown in FIG. 5, boost converter 135 may be configured in a boost configuration when boost configuration switch 410 is in a position to connect inductor 420 and switches of the first bridge rectifier 220 are used in a half-bridge configuration. Boost converter 135 may be configured in a boost configuration when a voltage from the voltage source is below a threshold voltage. Here, boost converter 135 may use power from LV battery 145 to pre-charge capacitors in HV DC-DC converter 130 and filter 160 to reduce an in-rush current to HV battery 140.

The controller 300 may be designed with and/or configured to execute an algorithm for control of the boost configuration switch 410, switches of the bridge driver 210, and switches of the first bridge rectifier 220. Controller 300 may be configured to control the operation of the single boost configuration switch 410 to configure the boost converter 135 into the boost configuration by controlling the single boost configuration switch 410 to connect one end of the inductor 420 to HV battery 140 and disconnect one leg of the HVDC 130 from the HV battery 140.

Figure 6:
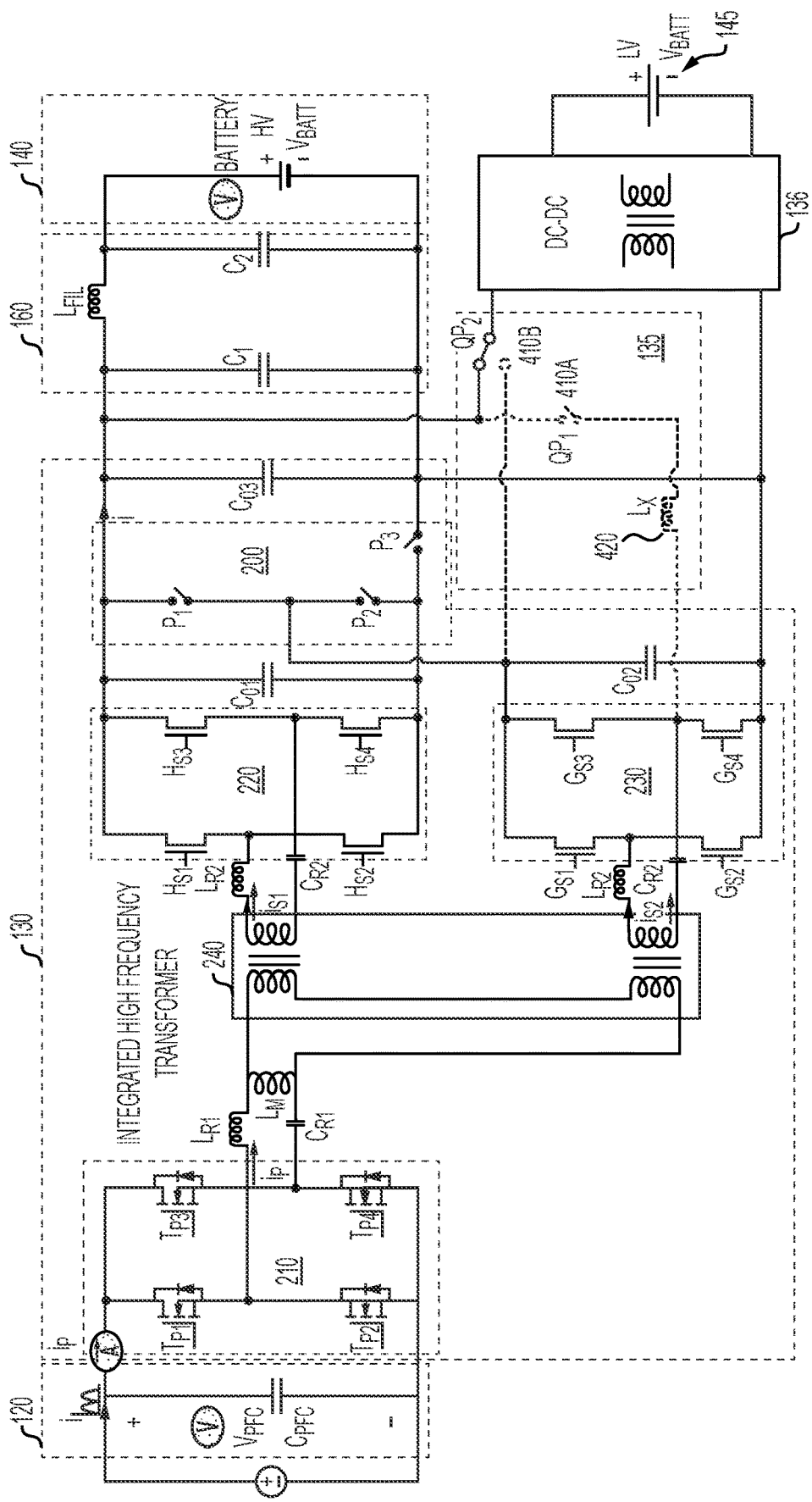
FIG. 6 depicts an exemplary electrical schematic for a battery charger with a dual transformer and an integrated boost converter in a bypass configuration, according to one or more embodiments.

FIG. 6 depicts an exemplary electrical schematic for a battery charger with a dual transformer and an integrated boost converter in a bypass configuration, according to one or more embodiments.

As shown in FIG. 6, capacitor Cpfc may be provided as a DC link capacitor at an output of PFC converter 120 with a voltage Vpfc to an input of HV DC-DC converter 130. HV DC-DC converter 130 may be operable to isolate the PFC converter 120 from HV battery 140. For example, HV DC-DC converter 130 may be a CLLLC converter, or any suitable DC-DC converter.

The battery charger 100 may be a system including PFC converter 120. HV DC-DC converter 130 may be connected to PFC converter 120. A voltage source may be connected to PFC converter 120, and HV battery 140 may be connected to HV DC-DC converter 130. Additionally, filter 160 may be provided between HV DC-DC converter 130 and HV battery 140.

The battery charger 100 may operate bidirectionally. A vehicle to grid (V2G) configuration may be achieved with a designed control strategy for multiple voltages. The PFC converter 120 may be configured to receive DC power from one or more of the HV battery 140 through the HV DC-DC converter 130 or the LV battery 145 through the LV DC-DC converter 136, convert the DC power to AC power, and provide the AC power as an output. The controller 300 may be designed with an algorithm to control an operation of the PFC converter 120 and HV DC-DC converter 130 to provide the AC power.

HV DC-DC converter 130 may include secondary configuration switches 200, bridge driver 210, first bridge rectifier 220, second bridge rectifier 230, and transformer 240.

Bridge driver 210 may include switches Tp1-Tp4, and may be operated as a full bridge driver or a half bridge driver, and transmit power as a square-wave signal from PFC converter 120 to transformer 240. Transformer 240 may be one or more high-frequency transformers and may be a single transformer with multiple coils or windings, multiple transformers with single coils or windings, or any combination thereof.

Transformer 240 may be connected to first bridge rectifier 220 and second bridge rectifier 230. First bridge rectifier 220 may include switches Hs1-Hs4. Second bridge rectifier 230 may include switches Gs1-Gs4. The switches of the first bridge rectifier 220 and the second bridge rectifier 230 may convert the square-wave signal to DC power.

Secondary configuration switches 200 may include secondary configuration switches P1-P3. Secondary configuration switches 200 may be open and closed as applicable to configure the first bridge rectifier 220 and the second bridge rectifier 230 into each of a single rectifier configuration, a parallel rectifier configuration, and a series rectifier configuration. Opening and closing of secondary configuration switches 200 may be controlled by controller 300. The controller 300 may control the operation of secondary configuration switches 200 based on one or more of a voltage of HV battery 140, a voltage of LV battery 145, an input grid voltage, a DC link voltage, a power requirement, and a state of charge of HV battery 140. However, the disclosure is not limited thereto, and controller 300 may control the operation of secondary configuration switches 200 based on any appropriate signal.

In the single rectifier configuration, either first bridge rectifier 220 or second bridge rectifier 230 may be used without using the other of the first bridge rectifier 220 or the second bridge rectifier 230. In the single rectifier configuration, the secondary configuration switches 200 and unused first bridge rectifier 220 or unused second bridge rectifier 230 may be operated such that all current passes through the first bridge rectifier 220 in use or second bridge rectifier 230 in use, and no current passes through the unused first bridge rectifier 220 or unused second bridge rectifier 230.

In the parallel rectifier configuration, the secondary configuration switches 200 and first bridge rectifier 220 and second bridge rectifier 230 may be operated such that current passes through the first bridge rectifier 220 and second bridge rectifier 230 in parallel.

In the series rectifier configuration, the secondary configuration switches 200 and first bridge rectifier 220 and second bridge rectifier 230 may be operated such that current passes through the first bridge rectifier 220 and second bridge rectifier 230 in series.

The battery charger 100 may include boost converter 135 connected to HV DC-DC converter 130, LV DC-DC converter 136 connected to boost converter 135, and LV battery 145 connected to LV DC-DC converter 136. Boost converter 135 may include boost configuration switches 410A (QP1) and 410B (QP2), and inductor 420. Boost converter 135 may also re-use switches from one or more of first bridge rectifier 220 and second bridge rectifier 230.

Figure 10:
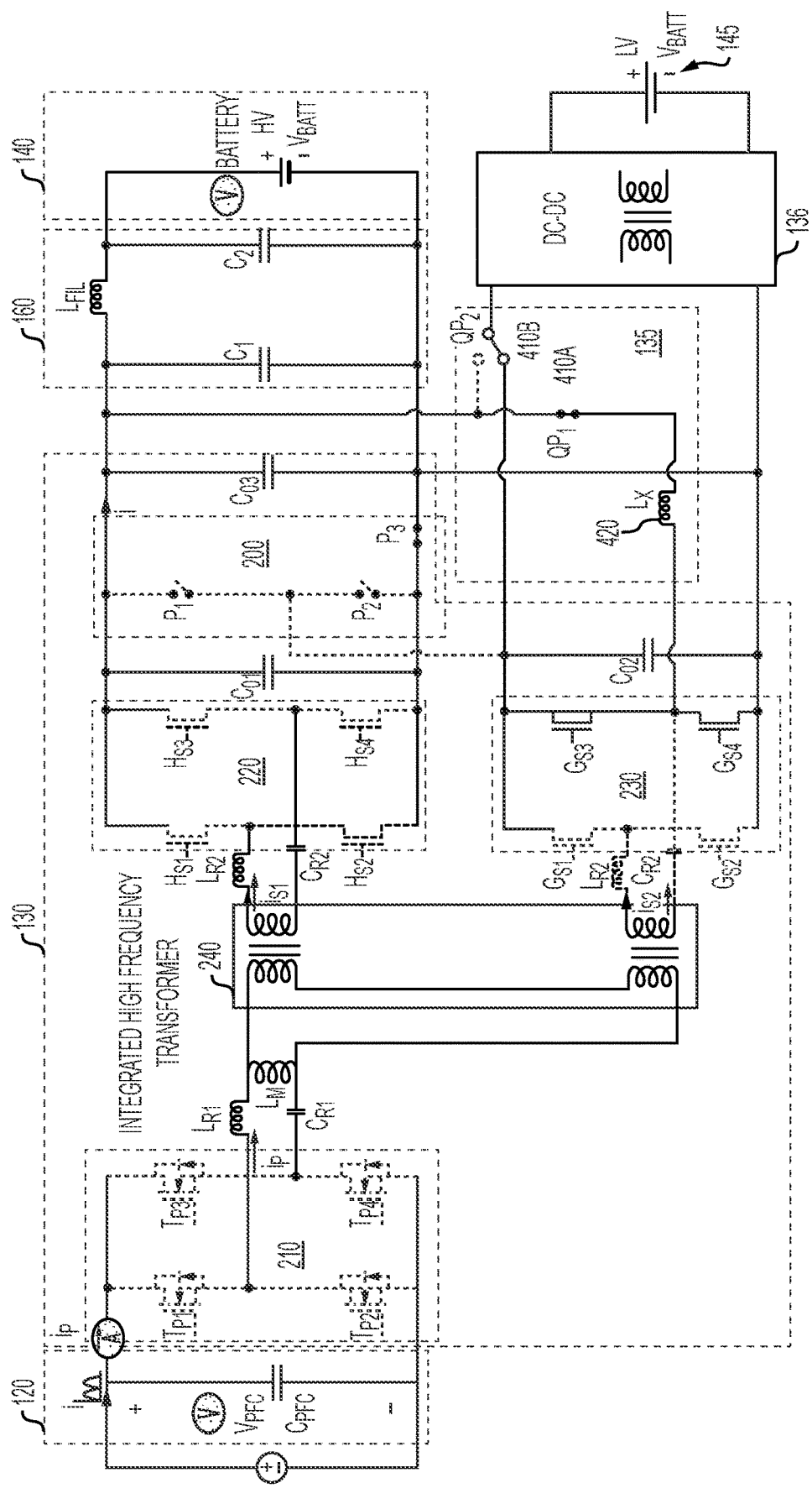
FIG. 10 depicts an exemplary electrical schematic for a battery charger with a dual transformer and an integrated boost converter in a buck-stage pre-charging configuration, according to one or more embodiments.
Figure 11:
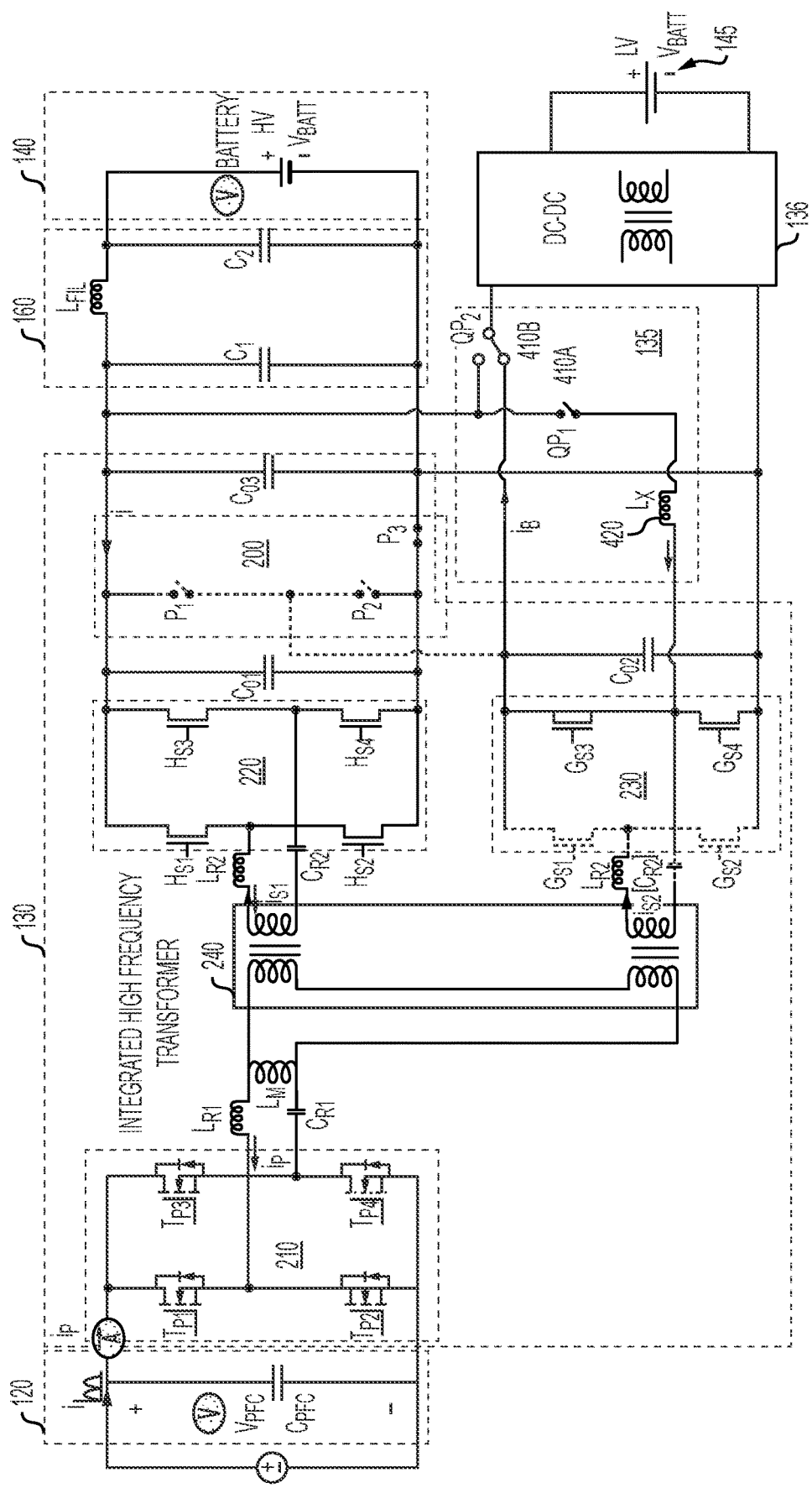
FIG. 11 depicts an exemplary electrical schematic for a battery charger with a dual transformer and an integrated boost converter in a vehicle-to-load configuration, according to one or more embodiments.

Boost configuration switches 410A and 410B may be open and closed as applicable to configure boost converter 135 into each of a bypass configuration (see FIG. 6), a boost configuration (see FIG. 7), a cascade configuration (see FIG. 8), a pre-charging configuration (see FIG. 9), a buck-stage pre-charging configuration (see FIG. 10), and a vehicle-to-load configuration (see FIG. 11). Opening and closing of boost configuration switches 410A and 410B may be controlled by controller 300. The controller 300 may control the operation of boost configuration switches 410A and 410B based on one or more of a voltage of HV battery 140, a voltage of LV battery 145, an input grid voltage, a DC link voltage, a power requirement, and a state of charge of HV battery 140. However, the disclosure is not limited thereto, and controller 300 may control the operation of boost configuration switches 410A and 410B based on any appropriate signal.

The controller 300 may be designed with and/or configured to run an algorithm for control of switches of the bridge driver 210, secondary configuration switches 200, switches of the first bridge rectifier 220, switches of the second bridge rectifier 230, and boost configuration switches 410A and 410B.

As shown in FIG. 6, boost converter 135 may be configured in a bypass configuration when switches of the bridge driver 210, secondary configuration switches 200, switches of the first bridge rectifier 220, switches of the second bridge rectifier 230, and boost configuration switches 410A and 410B are in positions as illustrated in FIG. 6. Secondary configuration switches 200 may be operated accordingly to allow the HV DC-DC converter 130 to be in cascaded or interleaved operation based on charging conditions. Boost converter 135 may be configured in a bypass configuration when a voltage from the voltage source is above a threshold voltage so that a sufficient voltage is applied to LV DC-DC converter 136 to charge LV battery 145.

Figure 7:
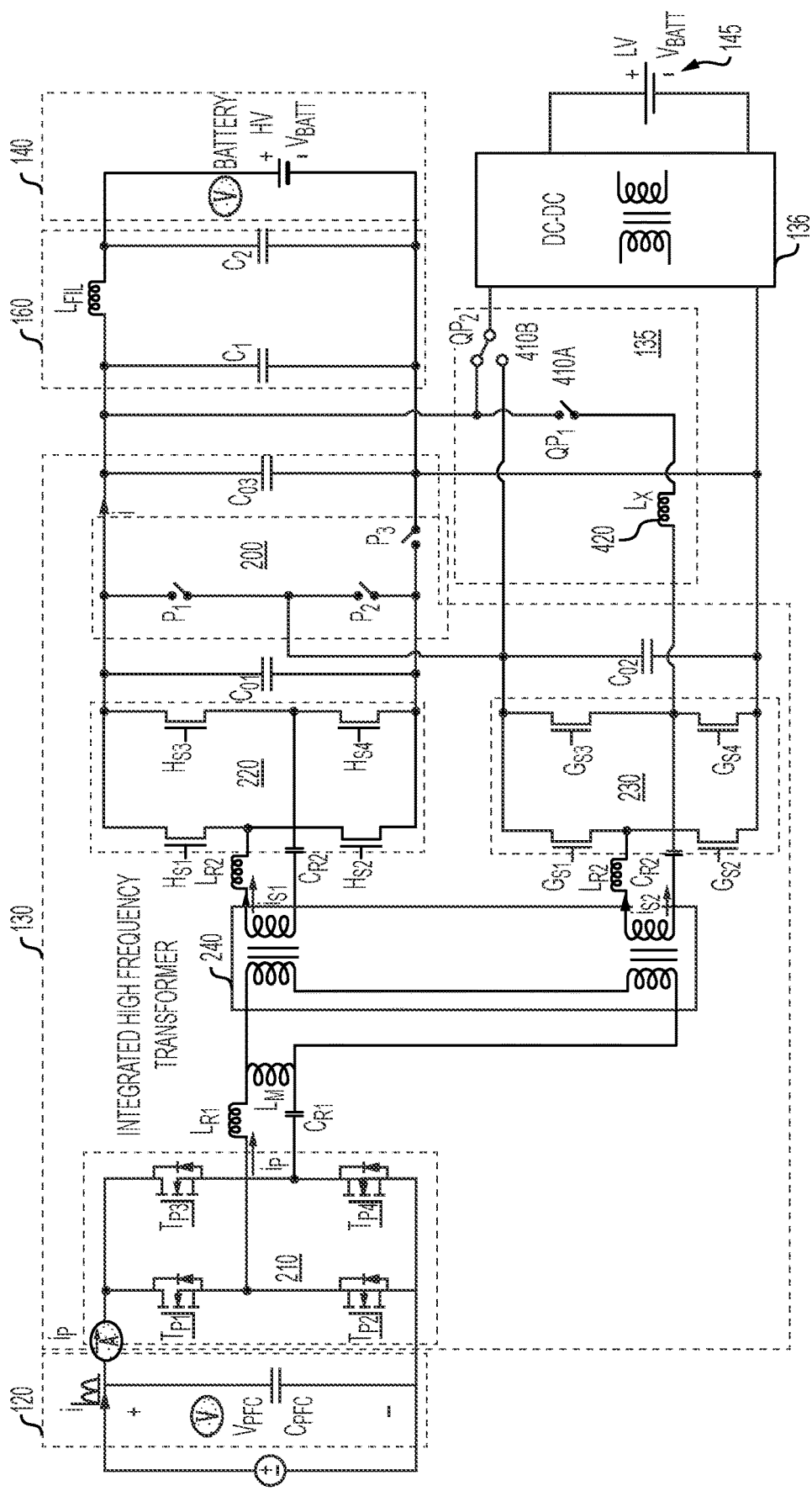
FIG. 7 depicts an exemplary electrical schematic for a battery charger with a dual transformer and an integrated boost converter in a boost configuration, according to one or more embodiments.

FIG. 7 depicts an exemplary electrical schematic for a battery charger with a dual transformer and an integrated boost converter in a boost configuration, according to one or more embodiments. The structure of battery charger 100 is described above with reference to FIG. 6.

As shown in FIG. 7, boost converter 135 may be configured in a boost configuration when switches of the bridge driver 210, secondary configuration switches 200, switches of the first bridge rectifier 220, switches of the second bridge rectifier 230, and boost configuration switches 410A and 410B are in positions as illustrated in FIG. 7.

Figure 8:
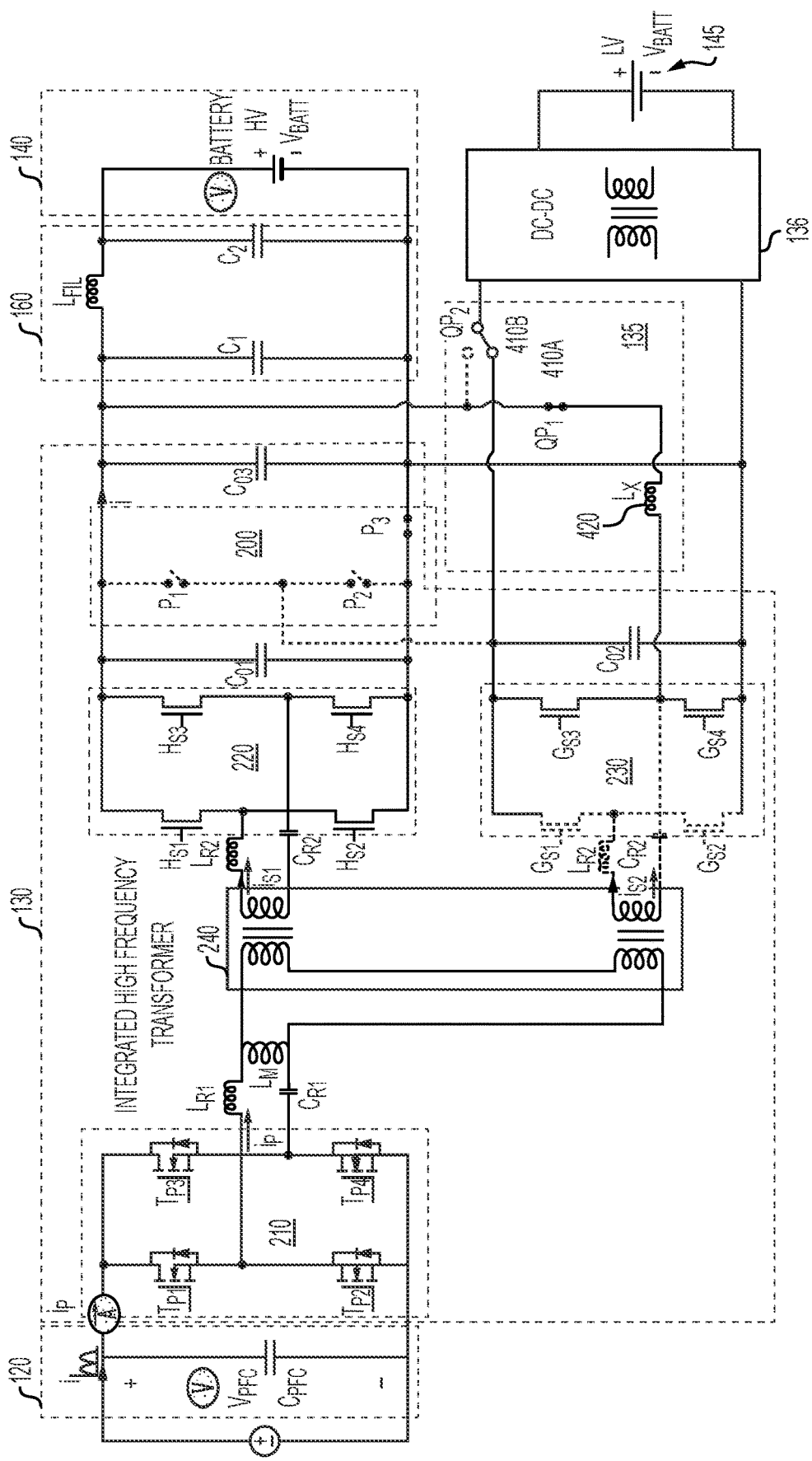
FIG. 8 depicts an exemplary electrical schematic for a battery charger with a dual transformer and an integrated boost converter in a cascade configuration, according to one or more embodiments.

FIG. 8 depicts an exemplary electrical schematic for a battery charger with a dual transformer and an integrated boost converter in a cascade configuration, according to one or more embodiments. The structure of battery charger 100 is described above with reference to FIG. 6.

As shown in FIG. 8, boost converter 135 may be configured in a cascade configuration when switches of the bridge driver 210, secondary configuration switches 200, switches of the first bridge rectifier 220, switches of the second bridge rectifier 230, and boost configuration switches 410A and 410B are in positions as illustrated in FIG. 8. Here, boost converter 135 is cascaded with LV DC-DC converter 136 to charge LV battery 145. Boost converter 135 may be configured in a cascade configuration when a voltage from the voltage source is below a threshold voltage so that a sufficient voltage is applied to LV DC-DC converter 136 to charge LV battery 145.

Figure 9:
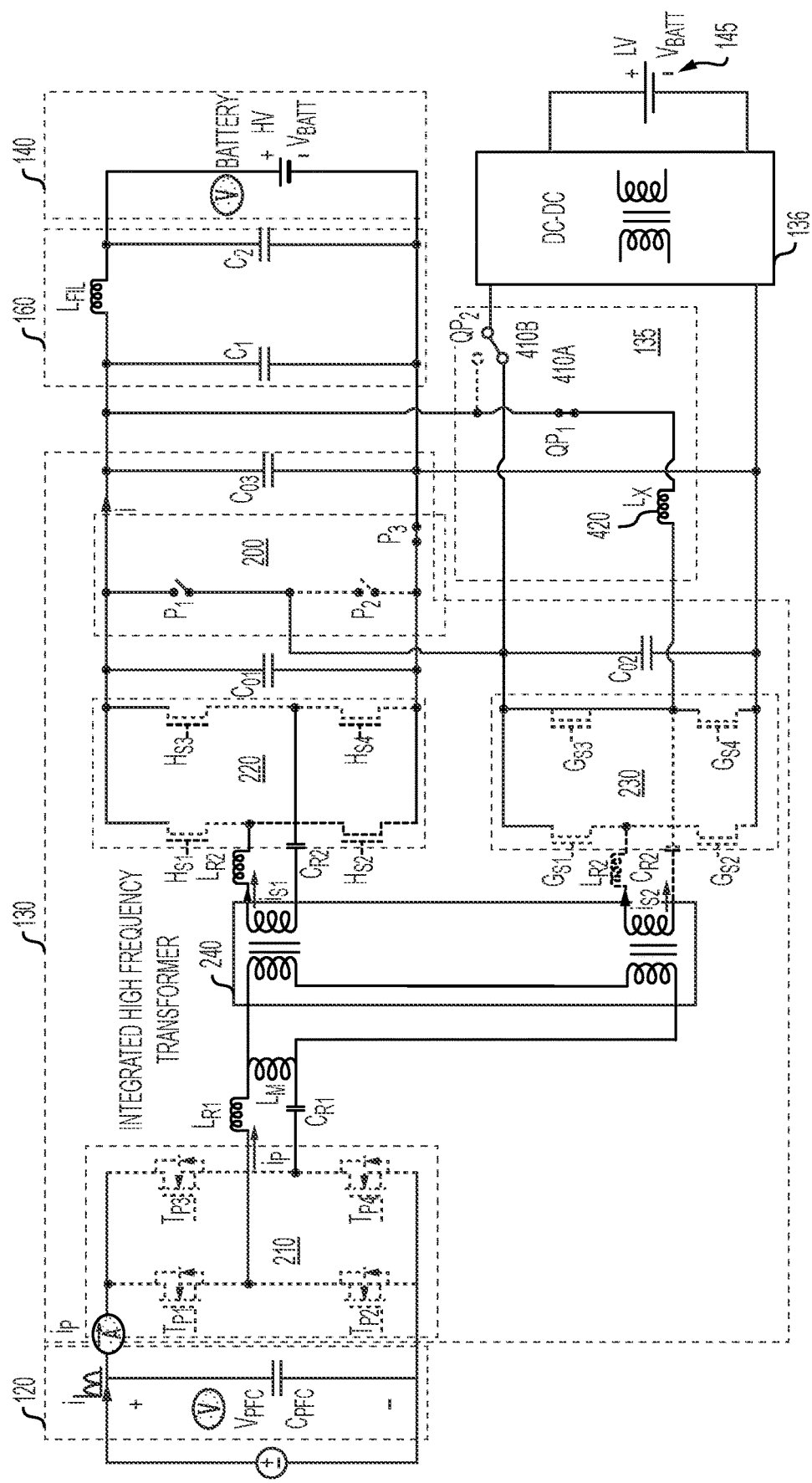
FIG. 9 depicts an exemplary electrical schematic for a battery charger with a dual transformer and an integrated boost converter in a pre-charging configuration, according to one or more embodiments.

FIG. 9 depicts an exemplary electrical schematic for a battery charger with a dual transformer and an integrated boost converter in a pre-charging configuration, according to one or more embodiments. The structure of battery charger 100 is described above with reference to FIG. 6.

As shown in FIG. 9, boost converter 135 may be configured in a pre-charging configuration when switches of the bridge driver 210, secondary configuration switches 200, switches of the first bridge rectifier 220, switches of the second bridge rectifier 230, and boost configuration switches 410A and 410B are in positions as illustrated in FIG. 9. Here, inductor 420 is connected to pre-charge capacitors in HV DC-DC converter 130 and filter 160 from LV battery 145. Inductor 420 forms an LC pair using Gs3 of second bridge rectifier 230, for example. Boost converter 135 may be configured in a pre-charging configuration during a start of a charging operation to reduce an in-rush current to HV battery 140.

FIG. 10 depicts an exemplary electrical schematic for a battery charger with a dual transformer and an integrated boost converter in a buck-stage pre-charging configuration, according to one or more embodiments. The structure of battery charger 100 is described above with reference to FIG. 6.

As shown in FIG. 10, boost converter 135 may be configured in a buck-stage pre-charging configuration when switches of the bridge driver 210, secondary configuration switches 200, switches of the first bridge rectifier 220, switches of the second bridge rectifier 230, and boost configuration switches 410A and 410B are in positions as illustrated in FIG. 10. Here, when a lower voltage is needed to HV battery 140 to pre-charge capacitors in HV DC-DC converter 130 and filter 160, the boost converter 135 may be configured in a buck-stage pre-charging configuration from LV battery 145.

FIG. 11 depicts an exemplary electrical schematic for a battery charger with a dual transformer and an integrated boost converter in a vehicle-to-load configuration, according to one or more embodiments. The structure of battery charger 100 is described above with reference to FIG. 6.

As shown in FIG. 11, boost converter 135 may be configured in a vehicle-to-load configuration when switches of the bridge driver 210, secondary configuration switches 200, switches of the first bridge rectifier 220, switches of the second bridge rectifier 230, and boost configuration switches 410A and 410B are in positions as illustrated in FIG. 11. In a vehicle-to-load configuration, operation of the boost converter 135 may work in any of the configurations described above. In a vehicle-to-load configuration, power is delivered from one or more of HV battery 140 or LV battery 145 to a grid or load, rather than from a voltage source to one or more of HV battery 140 or LV battery 145.

FIG. 12 depicts a flowchart of a method of operating a battery charger with an integrated boost converter, according to one or more embodiments.

As shown in FIG. 12, a method 1200 for controlling a system including a high voltage (HV) direct current (DC) to DC converter (HVDC) 130 including one or more transformers 240, a bridge driver 210 connected to a primary side of the one or more transformers 240, and one or more bridge rectifiers 220 connected to a secondary side of the one or more transformers 240, the one or more bridge rectifiers 220 including one or more bridge rectifier switches; a low voltage (LV) DC to DC converter (LVDC) 136 connected to the HVDC 130; and a boost converter 135 including an inductor 420 connected to the one or more bridge rectifier switches, and one or more boost configuration switches 410, may include performing, by a controller 300, operations including: controlling an operation of the one or more boost configuration switches 410, in combination with the one or more bridge rectifier switches, to configure the boost converter 135 into each of a bypass configuration and a boost configuration, to regulate a voltage at the LVDC 136 (operation 1210).

Method 1200 may include controlling an operation of one or more secondary configuration switches 200 operable to configure a first bridge rectifier 220 and a second bridge rectifier 230 of the one or more bridge rectifiers into each of a single rectifier configuration, a parallel rectifier configuration, and a series rectifier configuration (operation 1220).

Method 1200 may include controlling an operation of the one or more boost configuration switches 410, in combination with the one or more bridge rectifier switches and the one or more secondary configuration switches 200, to configure the boost converter 135 into each of a cascade configuration, a pre-charging configuration, a buck-stage pre-charging configuration, and a vehicle-to-load configuration, to regulate a voltage at the LVDC 136 (operation 1230).

Method 1200 may include controlling the operation of a first boost configuration switch 410A and a second boost configuration switch 410B of the one or more boost configuration switches 410, in combination with the one or more bridge rectifier switches and the one or more secondary configuration switches 200, to configure the boost converter 135 into each of the bypass configuration, the boost configuration, the cascade configuration, the pre-charging configuration, the buck-stage pre-charging configuration, and the vehicle-to-load configuration, by controlling the first boost configuration switch 410A to connect or disconnect one end of the inductor 420 to an HV battery 140, and controlling the second boost configuration switch 410B to connect the LVDC 136 to either the HV battery 140 or the second bridge rectifier 230 (operation 1240).

Method 1200 may include receiving input AC power, converting the AC power to DC power, and providing the DC power to one or more of the HV battery 140 and the LV battery 145 to charge one or more of the HV battery 140 and the LV battery 145, and receiving DC power from one or more of the HV battery 140 and the LV battery 145, converting the DC power to AC power, and providing the AC power as output AC power (operation 1250).

Method 1200 may include operating one or more switches of the bridge rectifier of the HVDC to regulate a voltage at the LVDC (operation 1260).

According to one or more embodiments, a boost converter may re-use components in the isolated DC-DC converter at stage II to operate without the additional switching devices of conventional boost converters. More specifically, rather than adding an additional two switching devices for the boost converter, two transistors of an existing half-bridge used for an on-board charger function are re-used to realize the boost function at the input of the LV DC-DC converter. This integrated boost converter may be used for pre-charging capacitors on the HV side using the LV battery, may be used for charging the LV battery using a DC-DC converter when high voltage (HV) is at a lower level, and may provide enhanced operation during de-rating conditions.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:
   a high voltage (HV) direct current (DC) to DC converter (HVDC) including:
     one or more transformers;
     a bridge driver connected to a primary side of the one or more transformers; and
     one or more bridge rectifiers connected to a secondary side of the one or more transformers, the one or more bridge rectifiers including one or more bridge rectifier switches;
   a low voltage (LV) DC to DC converter (LVDC) connected to the HVDC at the one or more bridge rectifiers; and
   a boost converter including:
     an inductor connected to the one or more bridge rectifier switches; and
     one or more boost configuration switches operable, in combination with the one or more bridge rectifier switches, to configure the boost converter into each of a bypass configuration and a boost configuration, to regulate a voltage at the LVDC.

2. The system of claim 1, further comprising:
   one or more controllers configured to control an operation of the one or more boost configuration switches and the one or more bridge rectifier switches.

3. The system of claim 2, wherein the one or more boost configuration switches includes a single boost configuration switch.

4. The system of claim 3, wherein the one or more controllers are configured to control the operation of the single boost configuration switch to configure the boost converter into the bypass configuration by controlling the single boost configuration switch to disconnect one end of the inductor from an HV battery and connect one leg of the HVDC to the HV battery.

5. The system of claim 3, wherein the one or more controllers are configured to control the operation of the single boost configuration switch to configure the boost converter into the boost configuration by controlling the single boost configuration switch to connect one end of the inductor to an HV battery and disconnect one leg of the HVDC from the HV battery.

6. The system of claim 2, wherein
   the one or more bridge rectifiers include a first bridge rectifier and a second bridge rectifier, and
   the one or more boost configuration switches include a first boost configuration switch and a second boost configuration switch.

7. The system of claim 6, wherein
   the one or more transformers includes a multiple winding transformer with a first secondary winding and a second secondary winding, and
   the first bridge rectifier is connected to the first secondary winding and the second bridge rectifier is connected to the second secondary winding.

8. The system of claim 7, further comprising:
   one or more secondary configuration switches operable to configure the first bridge rectifier and the second bridge rectifier into each of a single rectifier configuration, a parallel rectifier configuration, and a series rectifier configuration.

9. The system of claim 8, wherein the one or more boost configuration switches are further operable, in combination with the one or more bridge rectifier switches and the one or more secondary configuration switches, to configure the boost converter into each of a cascade configuration, a pre-charging configuration, a buck-stage pre-charging configuration, and a vehicle-to-load configuration, to regulate a voltage at the LVDC.

10. The system of claim 9, wherein the one or more controllers are configured to control the operation of the first boost configuration switch and the second boost configuration switch, in combination with the one or more bridge rectifier switches and the one or more secondary configuration switches, to configure the boost converter into each of the bypass configuration, the boost configuration, the cascade configuration, the pre-charging configuration, the buck-stage pre-charging configuration, and the vehicle-to-load configuration, by controlling the first boost configuration switch to connect or disconnect one end of the inductor to an HV battery, and controlling the second boost configuration switch to connect the LVDC to either the HV battery or the second bridge rectifier.

11. The system of claim 10, wherein the one or more bridge rectifier switches include one or more bridge rectifier switches of the first bridge rectifier and one or more bridge rectifier switches of the second bridge rectifier.

12. The system of claim 2, further comprising:
an alternating current (AC) to DC Power Factor Correction (PFC) converter connected to the bridge driver to provide the system as a battery charger,
an HV battery connected to the HVDC, and
an LV battery connected to the LVDC,
wherein the battery charger is configured to:
receive input AC power through the PFC converter, convert the AC power to DC power, and provide the DC power to one or more of the HV battery and the LV battery based on the operation of the one or more boost configuration switches to charge one or more of the HV battery and the LV battery, and
receive DC power from one or more of the HV battery through the HVDC or the LV battery through the LVDC based on the operation of the one or more boost configuration switches, convert the DC power to AC power, and provide the AC power through the PFC converter as output AC power.

13. The system of claim 12, wherein the one or more controllers are further configured to control the operation of the one or more boost configuration switches based on one or more of a voltage of one or more of the HV battery, the LV battery, or the AC power received through the PFC converter.

14. The system of claim 12, further comprising:
an electric vehicle including the battery charger, the HV battery, and the LV battery.

15. A method for controlling a system including a high voltage (HV) direct current (DC) to DC converter (HVDC) including one or more transformers, a bridge driver connected to a primary side of the one or more transformers, and one or more bridge rectifiers connected to a secondary side of the one or more transformers, the one or more bridge rectifiers including one or more bridge rectifier switches;
a low voltage (LV) DC to DC converter (LVDC) connected to the HVDC at the one or more bridge rectifiers; and
a boost converter including an inductor connected to the one or more bridge rectifier switches, and one or more boost configuration switches,
the method comprising performing, by one or more controllers, operations including:
controlling an operation of the one or more boost configuration switches, in combination with the one or more bridge rectifier switches, to configure the boost converter into each of a bypass configuration and a boost configuration, to regulate a voltage at the LVDC.

16. The method of claim 15, wherein the operations further include controlling an operation of one or more secondary configuration switches operable to configure a first bridge rectifier and a second bridge rectifier of the one or more bridge rectifiers into each of a single rectifier configuration, a parallel rectifier configuration, and a series rectifier configuration.

17. The method of claim 16, wherein the operations further include controlling an operation of the one or more boost configuration switches, in combination with the one or more bridge rectifier switches and the one or more secondary configuration switches, to configure the boost converter into each of a cascade configuration, a pre-charging configuration, a buck-stage pre-charging configuration, and a vehicle-to-load configuration, to regulate a voltage at the LVDC.

18. The method of claim 17, wherein the operations further include controlling the operation of a first boost configuration switch and a second boost configuration switch of the one or more boost configuration switches, in combination with the one or more bridge rectifier switches and the one or more secondary configuration switches, to configure the boost converter into each of the bypass configuration, the boost configuration, the cascade configuration, the pre-charging configuration, the buck-stage pre-charging configuration, and the vehicle-to-load configuration, by controlling the first boost configuration switch to connect or disconnect one end of the inductor to an HV battery, and controlling the second boost configuration switch to connect the LVDC to either the HV battery or the second bridge rectifier.

19. The method of claim 15, wherein the controlling the operation further includes:
receiving input AC power, converting the AC power to DC power, and providing the DC power to one or more of an HV battery and an LV battery based on the operation of the one or more boost configuration switches to charge one or more of the HV battery and the LV battery, and
receiving DC power from one or more of the HV battery and the LV battery based on the operation of the one or more boost configuration switches, converting the DC power to AC power, and providing the AC power as output AC power.

20. A method for controlling a system including a high voltage (HV) direct current (DC) to DC converter (HVDC) including one or more transformers, a bridge rectifier connected to a secondary side of the one or more transformers, and a low voltage (LV) DC to DC converter (LVDC) connected to the HVDC at the one or more bridge rectifiers, the method comprising:
operating one or more switches of the bridge rectifier of the HVDC to regulate a voltage at the LVDC.

* * * * *